United States Patent [19]

Kanda et al.

[11] Patent Number: 4,838,939

[45] Date of Patent: Jun. 13, 1989

[54] COMPOSITION PARTICULARLY ADAPTED TO DAMPING SHEETS FOR VEHICLES

[75] Inventors: Shigeru Kanda; Manabu Shibata; Masayoshi Ono, all of Kanagawa; Michikazu Okano, Hiroshima, all of Japan

[73] Assignees: Nihon Tokushu Toryo Co., Ltd., Tokyo; Hirotani Co., Ltd., Hiroshima, both of Japan

[21] Appl. No.: 134,182

[22] Filed: Dec. 17, 1987

[30] Foreign Application Priority Data

Dec. 18, 1986 [JP] Japan ................. 61-299872

[51] Int. Cl.$^4$ .................... C08L 95/00; C09D 3/24
[52] U.S. Cl. ................ 106/281.1; 106/282; 106/280; 106/202; 106/DIG. 7
[58] Field of Search .............. 106/281 R, 282, 280, 106/202, DIG. 7

[56] References Cited

U.S. PATENT DOCUMENTS

| | | | |
|---|---|---|---|
| 2,178,770 | 11/1939 | Zaisser | 106/282 |
| 3,808,164 | 4/1974 | Gulino et al. | 106/272 |
| 4,168,178 | 9/1979 | Hesseler | 106/DIG. 2 |
| 4,412,864 | 11/1983 | Kurashige et al. | 106/281 N |

FOREIGN PATENT DOCUMENTS 52-50522 12/1977 Japan .
56-5469 2/1981 Japan .

OTHER PUBLICATIONS

Hackh's Chemical Dictionary, 2nd Ed., pp. 543 and 778.

Primary Examiner—Paul Lieberman
Assistant Examiner—Helene Kirschner
Attorney, Agent, or Firm—Kenyon & Kenyon

[57] ABSTRACT

Compositions particularly adapted to the damping sheet are provided. They contain a binder component and a filler component consisting of inorganic fillers and an organic filler.

The organic filler occupies from 1 to 25 parts by weight of the total amount of the filler and it is an organic fibrous filler having the fiber length of from about 50 to about 300$\mu$, the mean length being about 100$\mu$. Quick lime occupies from 0.05 to 10 parts by weight of the total amount of the filler as one of the inorganic fillers. The compositions possess distinguished properties when used as the damping sheet for vehicles.

5 Claims, No Drawings

COMPOSITION PARTICULARLY ADAPTED TO DAMPING SHEETS FOR VEHICLES

FIELD OF THE INVENTION

The present invention relates to compositions which are particularly adapted to damping sheets for vehicles. More particularly, it relates to compositions which contain certain amount of an organic fibrous filler having a certain fiber length, in place of asbestos which is an essential filler in prior art, and certain amount of quick lime as a part of an inorganic filler component, and which are particularly adapted to damping sheets for vehicles.

BACKGROUND OF THE INVENTION

Damping sheets are normally employed in vehicles, in particular in motorcars, in order to decrease vibration during driving. Usually, they are placed or tentatively fixed upon the car floor or the steel panel such as dash panel and then fixed permenently by fusion with heat. Such sheets are prepared by melting one or more binder components which are, for example, asphalt (e.g. straight asphalt), natural or synthetic rubbers and/or various synthetic resins, then by incorporating into them fillers, namely a fibrous filler (e.g. asbestos) and a powdery filler (e.g. calcium carbonate, talc or diatomaceous earth), by blending and mixing the composition, then by rolling it to give a sheet, and finally by cutting it into desired shapes.

While asbestos is a suitable fibrous filler in order to impart tensile strength and rigidity to the damping sheet, it is quite harmful for humans and use thereof is going to be prohibited in view of public interest in health.

Therefore, there is strong need for compositions containing fibrous fillers, alternate to asbestos, that may give desired mechanical properties to the damping sheet.

Compositions suited for the damping sheet containing an organic filler are known, for example, in Japanese Patent Kokoku (that is to say Application published for opposition) Nos. 52-50522 and 56-5469. Kokoku No. 52-50522 discloses a composition for damping sheet that comprises 45-65% by weight of asphalt, 8-18% by weight of an organic fiber having the fiber length 0.5-5 mm and the section diameter less than 100 $\mu$, 20-35% by weight of a filler and 1-5% by weight of an asphalt denaturing agent Kokoku No. 56-5469 discloses a composition for damping sheet that comprises 45-65% by weight of asphalt, 8-18% by weight of an organic fiber having the fiber length 0.5-5 mm and the section diameter less than 100 $\mu$, 18-37% by weight of dust consisting mainly of silicon dioxide and 1-5% by weight of an asphalt denaturing agent.

Although the prior art compositions were able to replace asbestos by an organic filler, their characteristics were not fully satisfactory due to the use of somewhat excessive amount of the organic filler having quite a long fiber length and to the absence of quick lime as a part of an inorganic filler, as will be described hereinafter in detail.

BRIEF DESCRIPTION OF THE INVENTION

According to one aspect of the invention, there is provided a composition particularly adapted to the damping sheet that contains from 1 to 25 parts by weight, preferably from 1 to 11.5 parts by weight (based on the total amount of the filler) of an organic fibrous filler having the fiber length of from about 50 to about 300 $\mu$ and that contains further, as a part of inorganic filler component, from 0.05 to 10 parts by weight (based on the total amount of the filler) of quick lime, in addition to a binder component.

According to another aspect of the invention, there is provided a composition particularly adapted to the damping sheet that contains from 1 to 25 parts by weight, preferably from 1 to 11.5 parts by weight (based on the total amount of the filler) of an organic fibrous filler having the fibre length of from about 50 to about 300 $\mu$, from 0.05 to 10 parts by weight (based on the total amount of the filler) of quick lime as a part of inorganic filler component, and 10 parts or less by weight of an asphalt denaturing agent (based on the total amount of the composition), in addition to a binder component, when the said binder component is asphalt.

DETAILED DESCRIPTION OF THE INVENTION

The composition of the invention particularly adapted to the fusible damping sheet comprises at least one binder component and a filler component.

Preferred examples of the binder component include, for example, rubbers, synthetic resins and asphalts. It is preferable that the binder component is contained in an amount of from 10 to 60% by weight, based on the total weight of the composition. The content of less than 10% will bring about brittleness of the damping sheet, losing markedly the damping effect, whereas the content of more than 60% will bring about poor shape maintenance, heat resistance and damping effect.

Rubbers include, for example, natural rubbers and synthetic rubbers such as polybutadiene rubber, stryrene butadiene rubber, butyl rubber, neoprene rubber and chloroprene rubber. Use of reclaimed rubbers is desirable in view of economy or lowering the production cost.

Synthetic resins include, for example, petroluem resin, polyethylene, polypropylene and ethylene vinyl acetate copolymer.

Asphalts include, for example, straight asphalt, blown asphalt and semi-blown asphalt.

The binder component described above may be used either alone or in combination.

The filler component, which is preferably contained in an amount of from 40 to 90% by weight in the composition, consists of inorganic and organic fillers.

The nature of the inorganic filler is not critical and any material known in the art may be used.

Examples of inorganic fillers include, for example, talc, clay and calcium carbonate, which are powdery fillers, mica, which is a flaky filler, and silica balloon and glass balloon, which are spherical, hollow fillers.

It is a characteristic of composition the present invention that quick lime is used as an essential element as a part of the inorganic fillers. The amount of quick lime is preferably from 0.05 to 10% by weight, based on the total amount of the filler component. The function of quick lime is to absorb moisture in air and in the organic fibrous filler, as will be described in detail hereinbelow, whereby the fluctuation of the damping sheet may be prevented upon baking.

The content of quick lime of less than 0.05% will bring about insufficient absorption of water contained in the organic fibrous filler and therefore cause certain degree of fluctuation of the damping sheet upon baking. On the other hand, content of quick lime of more than 10% will bring about excessive absorption of moisture in air and cause handling troubles.

It is another characteristic of the composition of the invention that an organic fibrous filler is used as an essential element in admixture with quick lime. The organic fibrous filler substitutes for asbestos, which is commonly used as the fibrous filler in the prior art composition used for the damping sheet.

The organic fibrous filler includes, for example, animal fibers such as wool, plant fibers such as cotton and hemp, decomposed used fibers obtained from corrugated cardboard, newspaper, magazine or the like, and synthetic resinous fibers such as viscose rayon, acetates, acrylates, nylon, polyester and vinyl chloride.

The length of the organic fibrous filler should be in the range of about 50–300 $\mu$, medium length being about 100$\mu$.

The length of below 50 $\mu$ will bring about poor shape maintenance and heat resistance, whereas the length of above 300 $\mu$ will bring about poor shape formation of the composition upon the surface of the substrate material, possibly leading to occurrence of rust and lowering of damping effect.

The organic fibrous filler is used in an amount of from 1 to 25% by weight, preferably from 1 to 11.5% by weight, based on the total amount of the filler.

The content of less than 1% will bring about poor mechanical strength of the composition when it is shaped into sheets. On the other hand, the content of more than 11.5% and notably more than 25% will bring about excessive absorption of oils contained in the binder component, particularly when it is asphalt, resulting in poor shape formation of the composition upon the surface of the damping sheet.

It is a further characteristic of the invention that an asphalt denaturing agent is contained in an amount of 10 parts by weight or less, preferably from 0.1 to 10 parts by weight, based on the total amount of the composition, when asphalt is used as the binder component.

The asphalt denaturing agent is preferably employed when asphalt is used as the binder component, as it prevents snapping or cracking of the damping sheet at low temperature and improves impact resistance.

The nature of the asphalt denaturing agent is not critical and preferred examples include, for example, SBR and process oil. The amount of such asphalt denaturing agent should not exceed 10 parts by weight based on the total amount of the composition, as the content above 10 parts is not only uneconomical but also lowers heat resistance and the shaping property of asphalt.

The composition of the invention may be prepared by any method known in the art. One of the preferred methods comprises steps of melting a binder component, such as asphalt, with heat and mixing it with a filler component comprising an organic fibrous filler, quick lime and the other inorganic filler in a blender, while heating.

The composition of the invention is particularly adapted to the damping sheet. Thus, the composition of the invention then may be extruded and rolled to give a sheet. If desired, the sheet may be given uneven surface using, for instance, emboss roll.

Where the compositions of the invention is formed into a damping sheet, it may contain one or more conventional additives such as plasticizer, stabilizer, flame retardant, foaming agent, foaming aid, vulcanizer, or the like.

The damping sheet thus prepared is then cut into desired shape of the site, to which the sheet is adhered. Where appropriate, the sheet is trimmed with a mold of the desired shape, fitted with a trimmer, for adjusting the uneven shape of the site.

Where the damping sheet is shaped with mold, it is placed on the lower part of the mold, after which it is shaped by pressing it with the upper and lower parts of the mold.

Trimming and shaping of the damping sheet may be carried out simultaneously, for example, by using a mold fitted with a trimmer on either side, and this is a preferred method in view of the decreased steps involved and the increased operability.

Where the damping sheet is fixed upon the steel panel of the vehicle, it is first place on the panel in the case of the floor part of the vehicle, and then it is heat melted to complete adhesion. In the case of the dash part, the damping sheet is fixed tentatively upon the steel panel and then it is heat melted to complete adhesion. The tentative fixation may be performed using an adhesive or by the use of magnetic power.

The heat melting, or baking, may be in complete at a temperature of from about 80° to 180° C. for a period of from about 10 to 60 minutes, whereby the damping sheet and the steel panel may be unified.

Where the damping sheet is used as the soundproof material, together with a bulky non-woven fabric, such material may be baked likewise or, alternatively, it may be fixed using clips.

The other side of the sheet, namely the side which is not adhered to the steel panel, may be coated with a suitable paint, whereby it is imparted the function of being a restraint layer of the sandwiched damping material.

The invention will be explained in more detail by the following Examples and Experiment, which by no means limit the scope of this invention, in which parts and percentages are all by weight.

EXAMPLE 1

A mixture of 50 parts of a binder component consisting of 50% of butyl rubber, 40% of ethylene vinyl acetate copolymer and 10% of a reclaimed rubber, and 50 parts of a filler component consisting of 6% of a fibrous filler obtained by cutting and decomposing used paper, or flocks and hards, 6% of a scrap acrylic fiber, 86% of calcium carbonate and 2% of quick lime was blended and rolled to give a damping sheet of thickness 3.0 mm.

EXAMPLE 2

A mixture of 40 parts of asphalt consisting of 45% of straight asphalt and 55% of blown asphalt, 5 parts of a reclaimed rubber, 1.5 parts of an asphalt denaturing agent, and 50 parts of a filler component consisting of 6% of a fibrous filler obtained by cutting and decomposing used paper, or flocks and hards, 6% of a scrap acrylic fiber, 86.5% of calcium carbonate and 1.5% of quick lime was blended and rolled to give a damping sheet of thickness 3.0 mm.

Experiment

In order to determine the degree of achievement obtained by the composition according to the present invention, the loss factor of the damping sheet obtained in Examples 1 and 2 was measured. It is believed that a loss factor over 0.04 proves the effectiveness. The results are shown in the following Table.

|  |  | 40° C. | 60° C. | 80° C. |
|---|---|---|---|---|
| Loss factor | Example 1 | 0.16 | 0.12 | 0.08 |
|  | Example 2 | 0.18 | 0.13 | 0.08 |

As evidenced by the results shown above, the composition of the present invention exhibits superior damping effect, notwithstanding the fact that no asbestos is contained in it.

What is claimed is:

1. A composition particularly adapted to damping sheets containing a binder component and a filler component consiting of inorganic fillers and an organic filler, which comprises from 1 to 25 parts by weight, based on the total amount of the filler, of an organic fibrous filler having a fiber length of from about 50 to about 300 μ, the means length being about 100μ, and from 0.05 to 10 parts by weight, based on the total amount of the filler, of quick lime, as one of the inorganic fillers.

2. A composition as claimed in claim 1, wherein the content of the organic fibrous filler is from 1 to 11.5 parts by weight, based on the total amount of the filler.

3. A composition as claimed in claim 1, wherein the binder component is asphalt.

4. A composition as claimed in claim 3 which further contains 10 parts by weight or less of an asphalt denaturing agent.

5. A damping sheet for vehicles manufactured from the composition of claim 1.

* * * * *